United States Patent
Tokumitsu et al.

(10) Patent No.: US 8,204,123 B2
(45) Date of Patent: Jun. 19, 2012

(54) MOTION VECTOR SEARCHING APPARATUS, MOTION VECTOR SEARCHING METHOD AND STORAGE MEDIUM FOR STORING MOTION VECTOR SEARCHING PROGRAM

(75) Inventors: Masayuki Tokumitsu, Tokyo (JP); Satoshi Nakagawa, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 1149 days.

(21) Appl. No.: 12/010,356

(22) Filed: Jan. 24, 2008

(65) Prior Publication Data

US 2008/0219352 A1 Sep. 11, 2008

(30) Foreign Application Priority Data

Mar. 9, 2007 (JP) .................................. 2007-060040

(51) Int. Cl.
  *H04N 7/12* (2006.01)
  *H04N 11/02* (2006.01)
  *H04N 11/04* (2006.01)
  *G06K 9/46* (2006.01)

(52) U.S. Cl. ......... 375/240.16; 375/240.03; 375/240.19; 348/413; 382/239

(58) Field of Classification Search ........... 375/240.12–240.16, 240.26; 348/413–416; 382/218–239, 162–190

See application file for complete search history.

(56) References Cited

U.S. PATENT DOCUMENTS

| | | | | |
|---|---|---|---|---|
| 5,072,290 A * | 12/1991 | Yamagami et al. | ...... | 375/240.25 |
| 5,379,757 A * | 1/1995 | Hiyama et al. | ................ | 600/109 |
| 6,463,179 B1 * | 10/2002 | Kondo et al. | ................ | 382/239 |
| 6,904,172 B2 * | 6/2005 | Kondo et al. | ................ | 382/233 |
| 6,975,771 B1 * | 12/2005 | Kondo et al. | ................ | 382/239 |
| 7,535,961 B2 * | 5/2009 | Cho et al. | ................ | 375/240.12 |
| 7,630,435 B2 * | 12/2009 | Chen et al. | ............... | 375/240.03 |
| 2005/0047506 A1 * | 3/2005 | Kadono et al. | ........... | 375/240.12 |
| 2005/0047509 A1 * | 3/2005 | Lee et al. | ................ | 375/240.19 |
| 2005/0141612 A1 * | 6/2005 | Abe et al. | ................ | 375/240.16 |
| 2006/0093038 A1 * | 5/2006 | Boyce | ..................... | 375/240.16 |

FOREIGN PATENT DOCUMENTS

| | | |
|---|---|---|
| JP | 10-013838 A | 1/1998 |
| JP | 2006-509467 | 3/2006 |
| JP | 2006-509467 A | 3/2006 |

OTHER PUBLICATIONS

"Revised Edition H. 264/AVC Text", edited by Shinya Kadono, et al., published by Impress Co., Jan. 2006.

* cited by examiner

*Primary Examiner* — Man Phan
(74) *Attorney, Agent, or Firm* — Rabin & Berdo, P.C.

(57) ABSTRACT

A motion vector searching apparatus to which a reference image, an object image and weight parameters for the reference image are inputted and searches a motion vector based thereon is provides. The motion vector searching apparatus includes an inverse weighting section that generates an inverse weighted object image by performing, on the object image using the weight parameter, a weighting inverse from a weighting performed on the reference image using the weight parameter; an image comparing section that compares the generated inverse weighted object image with the reference image to obtain a comparison value indicating a degree of approximation between the two images; and a determination section that determines an optimum motion vector from the comparison value.

11 Claims, 7 Drawing Sheets

INTEGER PIXEL AND HALF PIXEL

FIG. 6A

INTEGER PIXEL

☐ : INTEGER PIXEL

○ : HALF PIXEL

FIG. 7

MOTION VECTOR SEARCHING APPARATUS, MOTION VECTOR SEARCHING METHOD AND STORAGE MEDIUM FOR STORING MOTION VECTOR SEARCHING PROGRAM

CROSS-REFERENCE TO RELATED APPLICATION

This application claims priority under 35 USC 119 from Japanese Patent Application No. 2007-060040, the disclosure of which is incorporated by reference herein.

BACKGROUND OF THE INVENTION

1. Field of the Invention

The present invention relates to a motion vector searching apparatus, a motion vector searching method and a storage medium for storing a motion vector searching program. The present invention is applicable to, for example, a moving image (video) coding apparatus, a moving image coding method and a storage medium for storing a moving image coding program.

2. Description of the Related Art

MPEG4-AVC/H.264 (ISO/IEC 14496-10) has been known as a moving image coding technology (see "Revised Edition H. 264/AVC Text", supervised by Sakae Okubo, jointly edited by Shinya Kadono, Yoshihiro Kikuchi and Teruhiko Suzuki, published by Impress Co., January, 2006, referred as Document 1 hereinafter).

This moving image coding technology generates a prediction block per pixel block of a frame to be coded when coding the target frame, and finds a prediction error that is a difference between the prediction block and the pixel block of the target frame to encode it.

A technology described in Japanese Patent Application National Publication (Laid-Open) No. 2006-509467 described below relates to one of this prediction image generating methods and enhances coding efficiency by focusing on changes of temporal brightness of images.

The technology described in National Publication No. 2006-509467 searches a motion vector by generating a prediction image by multiplying a reference image block by a weight, and adding an offset thereto.

After the weight and offset are determined, the prediction block is generated by multiplying the reference image block of the reference image, from which the motion vector is to be searched, by the weight with and adding the offset thereto. That is, all pixels in the prediction block Pred [x, y] are found in accordance to the following expression (1), where W is the weight, D is the offset, and ref [x, y] is the pixel data of the reference image:

$$Pred\ [x, y] = ref\ [x+MVx, y+MVy] * W + D \quad (1)$$

In the expression (1), x and y are x and y coordinates of each pixel and MYx and MVy are x and y components of a motion vector. The operation of multiplying the weight and adding the offset as indicated in the expression (1) will be referred as "weighting" hereinafter.

Then, an inter-block difference between the obtained prediction block Pred [x, y] and a coding object block (an original block to be coded) org [x, y] is determined. The inter-block difference diff may be found in accordance to the following expression (2) for example. When the inter-block difference is smaller than a threshold value or is smaller than a previous difference, the current processing is terminated and the current candidate motion vector and weighting factor are employed.

$$diff = \sum_{x,y} (|org[x, y] - pred[x, y]|) \quad (2)$$

In the technique disclosed in National Publication No. 2006-509467, the reference image once weighted may be stored separately as the weighted reference image.

Here, the reference image for carrying out the motion vector search not only includes images having an integer number of pixels. The motion vector search may be also carried out in half pixel precision or quarter pixel precision by generating pixels at a pixel position of half pixel precision or quarter pixel precision by interpolation. This is an existing technique necessary for carrying out the motion vector search at high precision. Therefore, in such a case, a number of pixels to be searched will increase as compared to when the number of the pixels of the reference image are counted in a unit of an integer number of pixels.

Figure 6A:
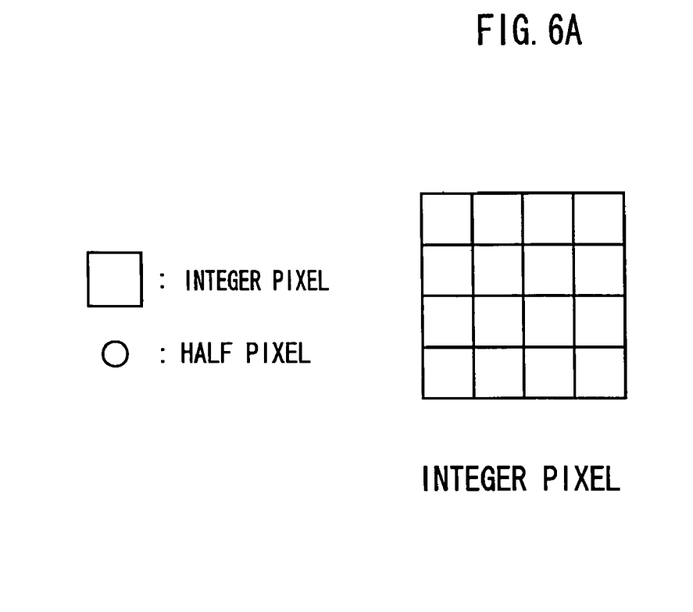
FIGS. 6A and 6B are explanatory diagrams showing a conventional interpolating method for a reference image.
Figure 6B:
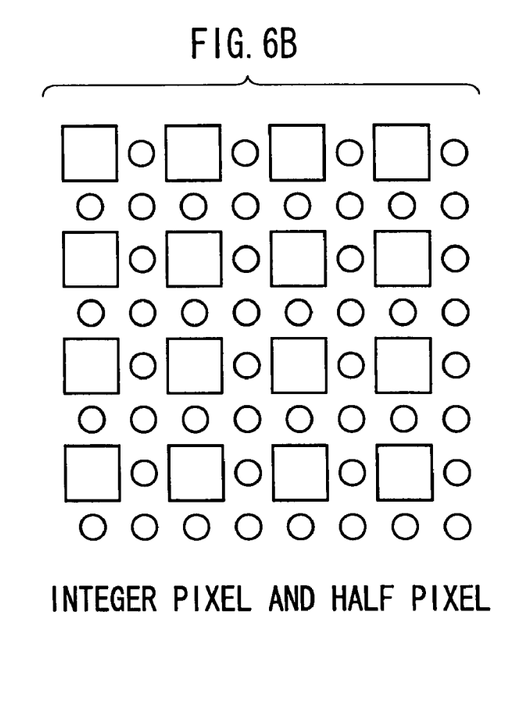

FIG. 6A shows an image composed of 4×4 integer pixels and FIG. 6B shows an image in which pixels of half pixel precision are added to the image composed of the 4×4 integer pixels. The pixels of half pixel precision are disposed so as to interpolate between the integer pixels. As seen from FIGS. 6A and 6B, in case of the block of 4×4 integer pixels, the reference image may have 16 pixels in the unit of the integer number of pixels, and may have 64 pixels when the pixels are counted including the pixels of half pixel precision. The number of pixels increases more up to 256 pixels when the pixels are counted including the pixels of quarter pixel precision.

Generally, when interpolation is carried out on an image composed of n×m pixels, a number of pixels of the interpolated image including integer pixels and pixels of half pixel precision is 4×n×m pixels, which is four times greater than the case of counting only the integer pixels. When the interpolation is carried out on the image composed of n×m pixels such that a number of pixels of the interpolated image including the integer pixels and pixels of half pixel precision and quarter pixel precision will be 16×n×m pixels, the number of pixels of the interpolated image will be 16 times greater than the case of counting only the integer pixels. Assume a case when a coding object image has a size of standard TV, i.e., 720×480 pixel size. In this case, a number of pixels of the image counting integer pixels is 345,600. A number of pixels of an interpolated image including the integer pixels and pixels of half pixel precision amounts to 1,382,400, and a number of pixels of an interpolated image including the integer pixels, pixels of half pixel precision, and pixels of quarter pixel precision amounts to 5,529,600.

A concrete interpolation image generating method, in the case of H. 264 for example, is described in a section "Predictive interpolation Signal" in pp. 115 through 118 of Document 1.

The pixels of the precision finer than the integer pixel is used to enhance precision of the motion vector search and coding efficiency. Interpolated images of half pixel precision and quarter pixel precision must be taken into account as a motion vector searching range of the reference image, which are very wide. Since the conventional technique requires weighting process carried out on the reference image, the weighting process must be carried out widely on the whole pixels of the reference image, which an amount of calculations becomes enormous.

Furthermore, in the conventional technique, the weighted pixels are stored together with the normal pixels. However, because the motion vector searching range of the reference image is very wide as described above, a large memory capacity is required to store the weighted pixels. Therefore, it is difficult to implement the technology in a built-in device in which a memory area is limited.

Figure 7:
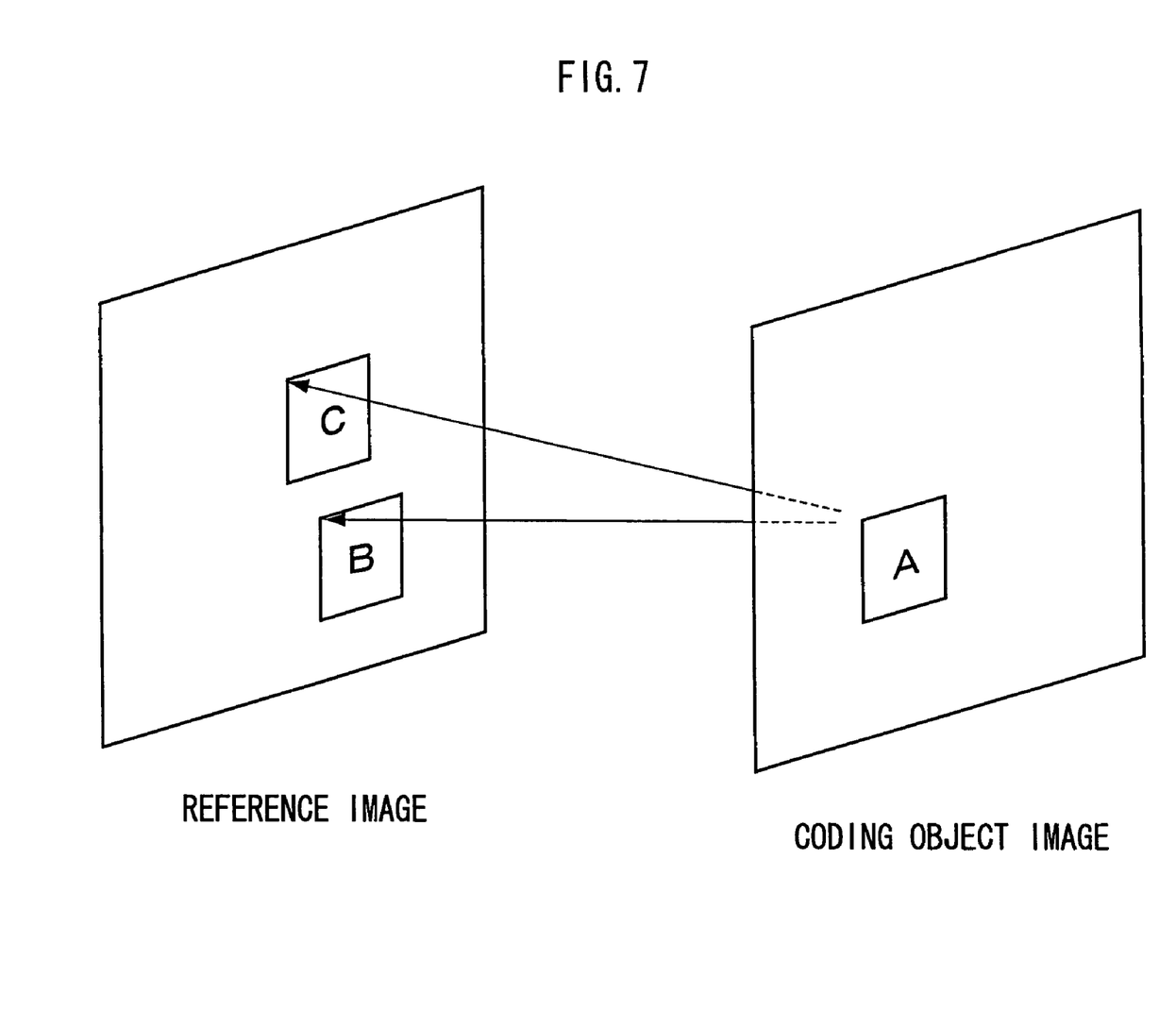
FIG. 7 is an explanatory diagram showing a relationship between a coding object block and reference image blocks in the conventional technology.

FIG. 7 shows a relationship between the reference image and the coding object image. A block A is a coding object block (block to be coded) in the coding object image and blocks B and C are reference image blocks in the reference image. As shown in FIG. 7, one coding object block refers to the reference image blocks in the reference image by plural times. Therefore, if the weighted reference image is not stored, the weighted image must be generated many times for the reference image block. Therefore, when the weighted reference image is not stored, it takes calculation time even through a capacity for storing the weighted image becomes unnecessary.

Still more, in the motion vector search, an area outside of a screen is generally also included, as an area where edges of the screen is extended, in a searching range, and thus, in general, an area larger than the coding object image is searched.

As described above, the conventional technique takes time for calculations because the weighting process must be carried out on a large searching range and is difficult to be implemented in a built-in device or the like because it requires a large memory capacity.

Therefore, a motion vector searching apparatus, a motion vector searching method and storage medium for storing a motion vector searching program, that carry out the motion vector search in a short time without requiring a large memory capacity, are desired.

SUMMARY OF THE INVENTION

A first aspect of the invention is a motion vector searching apparatus to which a reference image, an object image and a weight parameter for the reference image are inputted, for searching a motion vector based thereon, the apparatus including: an inverse weighting section for generating an inverse weighted object image by performing, on the object image using the weight parameter, a weighting inverse from a weighting performed on the reference image using the weight parameter; an image comparing section that compares the generated inverse weighted object image with the reference image to obtain a comparison value indicating a degree of approximation between the two images; and a determination section that determines an optimum motion vector by utilizing the comparison value.

A second aspect of the invention is a motion vector searching method in which a reference image, an object image and weight parameters for the reference image are input, and a motion vector is searched based thereon, the method including: generating an inverse weighted object image by performing on the object image using the weight parameter, a weighting inverse from a weighting performed on the reference image using the weight parameter; comparing the generated inverse weighted object image with the reference image to obtain a comparison value indicating a degree of approximation between the two images; and determining an optimum motion vector by utilizing the comparison value.

A third aspect of the invention is a computer readable storage medium storing a motion vector searching program for searching a motion vector on the basis of a reference image, an object image and a weight parameter for the reference image which are inputted, the program causing a computer to execute a process including: generating an inverse weighted object image by performing, on the object image by using the weight parameter, a weighting inverse from a weighting performed on the reference image by using the weight parameter; comparing the generated inverse weighted object image with the reference image to obtain a comparison value indicating a degree of approximation between the two images; and determining an optimum motion vector by utilizing the comparison value.

BRIEF DESCRIPTION OF THE DRAWINGS

Exemplary embodiments of the present invention will be described in detail based on the following figures, wherein.

DETAILED DESCRIPTION OF THE INVENTION (A) First Embodiment

A first embodiment of a motion vector searching apparatus, a motion vector searching method and a storage medium for storing a motion vector searching program of the present invention will be explained below in detail with reference to the drawings.

(A-1) Configuration of the First Embodiment

Figure 1:
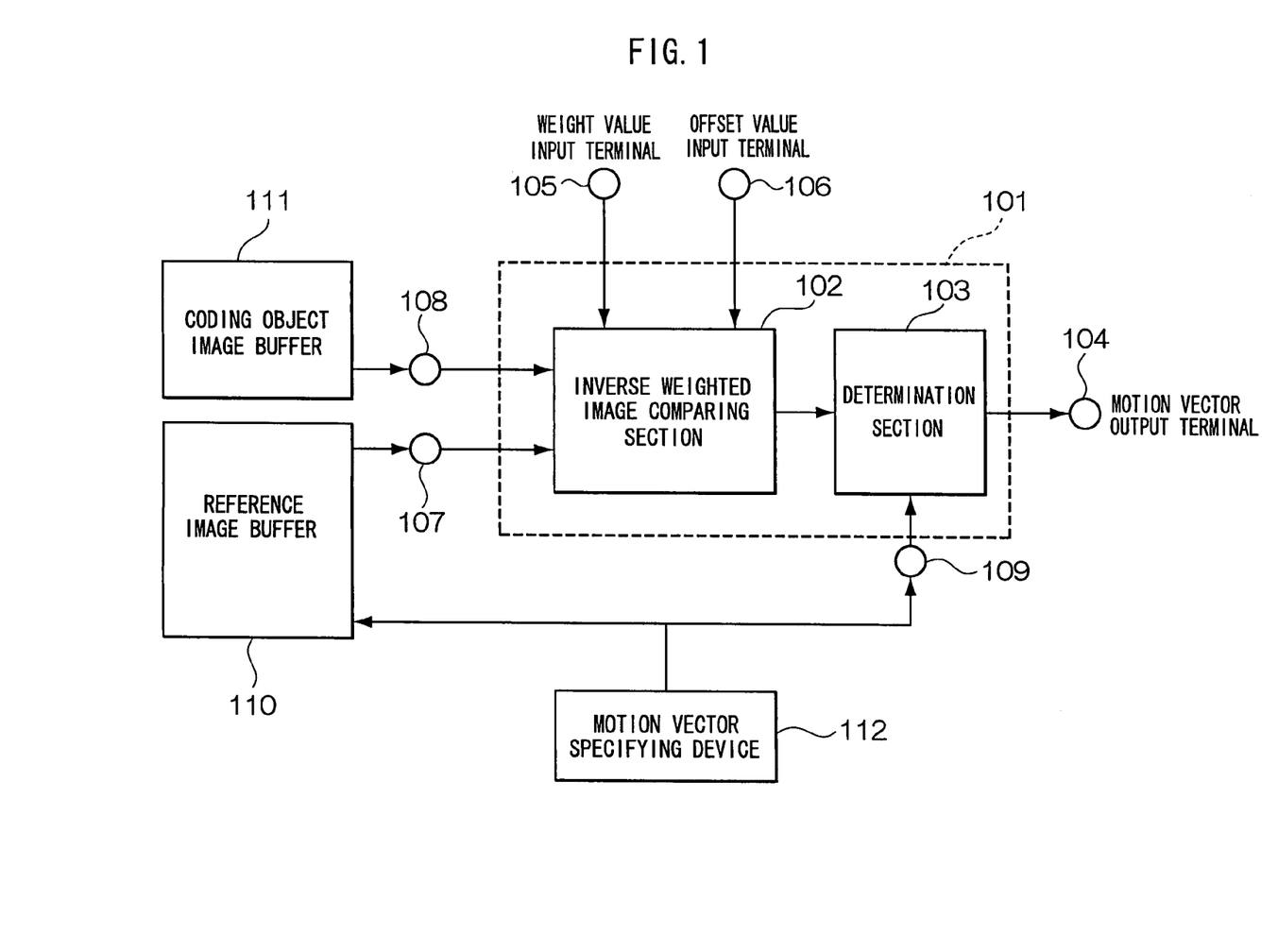
FIG. 1 is a block diagram showing an overall configuration of a motion vector searching apparatus of a first embodiment.

FIG. 1 is a block diagram showing an overall configuration of the motion vector searching apparatus 101 of the first embodiment. The "motion vector searching apparatus" of the first embodiment will be called also as an "inverse weighting motion vector searching apparatus" hereinafter.

The whole or part of the inverse weighting motion vector searching apparatus 101 of the first embodiment may be composed of hardware or may be composed of a CPU and a software based on a program executed by the CPU. In either case, the vector searching apparatus 101 may have a functional configuration as shown in FIG. 1.

In FIG. 1, the inverse weighting motion vector searching apparatus 101 includes, an inverse weighted image comparing section 102, a determination section 103 as its components, a motion vector output terminal 104 as an output terminal, and a weight value input terminal 105, an offset value input terminal 106, a reference image input terminal 107, a coding object image input terminal 108 and a motion vector input terminal 109 as input terminals.

The coding object image input terminal 108 is connected to a coding object image buffer 111 located external and supplies data of the coding object image buffered in the coding object image buffer 111 to the inverse weighted image comparing section 102.

The reference image input terminal 107 is connected to a reference image buffer 110 located external and supplies data of the reference image buffered in the reference image buffer 110 to the inverse weighted image comparing section 102.

The weight value input terminal 105 is connected to the inverse weighted image comparing section 102 to supply a weight value given from the external to the inverse weighted image comparing section 102. The offset value input terminal 106 is connected to the inverse weighted image comparing section 102 to supply an offset value given from the external to the inverse weighted image comparing section 102.

The motion vector input terminal 109 is connected with a motion vector specifying device 112 located external and supplies (candidate information of) a motion vector specified by the motion vector specifying device 112 to the determination section 103. Further, the motion vector specified by the motion vector specifying device 112 is also given to the reference image buffer 110.

Figure 2:
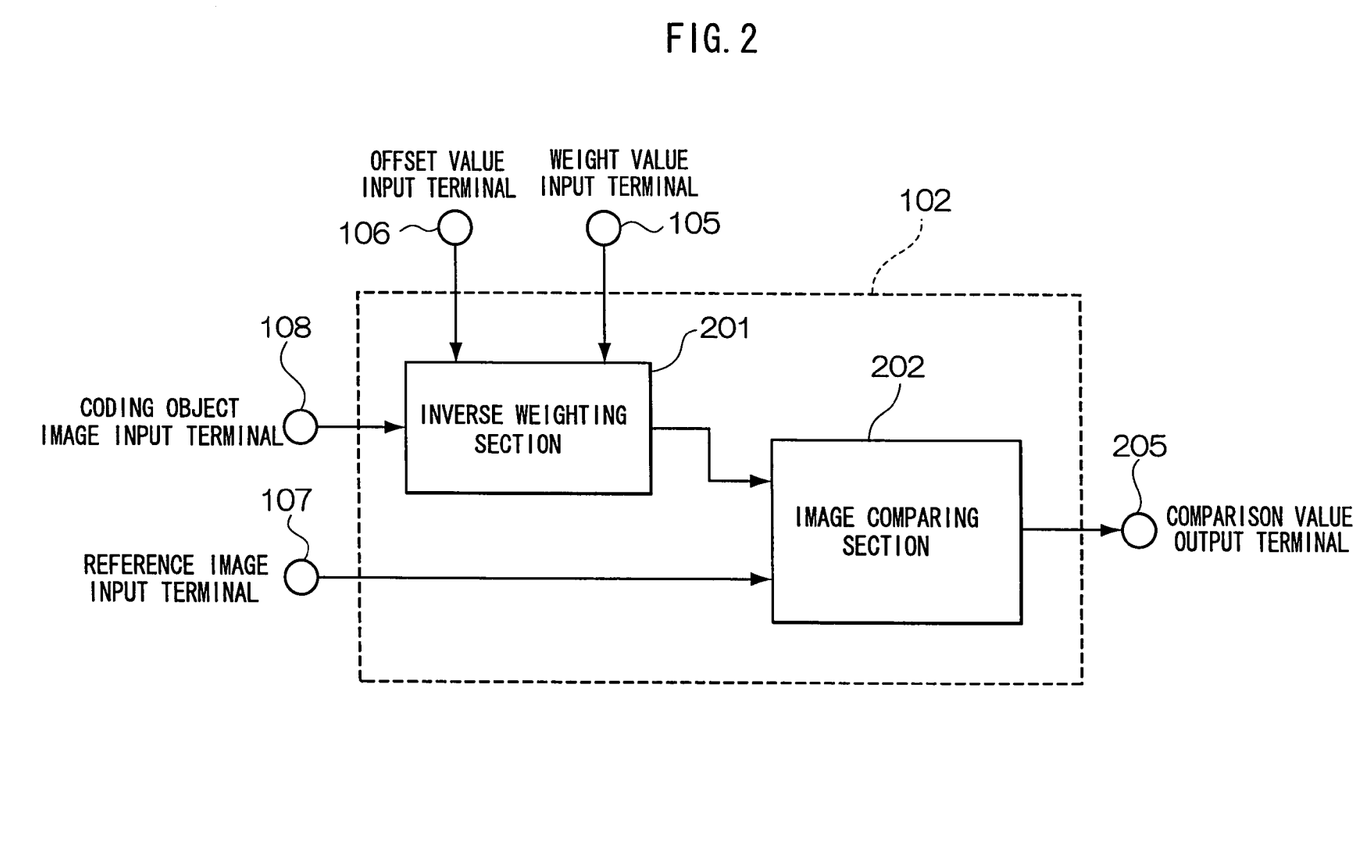
FIG. 2 is a block diagram showing a detailed configuration of an inverse weighted image comparing section of the first embodiment.

The inverse weighted image comparing section 102 has a configuration as shown in FIG. 2 described later in detail. The inverse weighted image comparing section 102 implements inverse weighting by applying the weight value and offset value inputted through the weight value input terminal 105 and the offset value input terminal 106 to the coding object image data inputted through the coding object image input terminal 108. Then, the inverse weighted image comparing section 102 compares inverse weighted coding object image data with the reference image data inputted through the reference image input terminal 107. Information on the comparison result of the inverse weighted image comparing section 102 is given to the determination section 103.

The determination section 103 handles the (candidate information) on the motion vector specified by the motion vector specifying device 112 and the information on the comparison result given at that time from the inverse weighted image comparing section 102 as one set of information, and based on plural sets of information, determines a motion vector searching result. Then, the determination section 103 outputs the determination result to the motion vector output terminal 104.

FIG. 2 is a block diagram showing the detailed configuration of the inverse weighted image comparing section 102. In FIG. 2, the inverse weighted image comparing section 102 includes an inverse weighting section 201 and an image comparing section 202 and supplies an comparison value obtained by the image comparing section 202 to the determination section 103 (see FIG. 1) through a comparison value output terminal 205.

Figure 3:
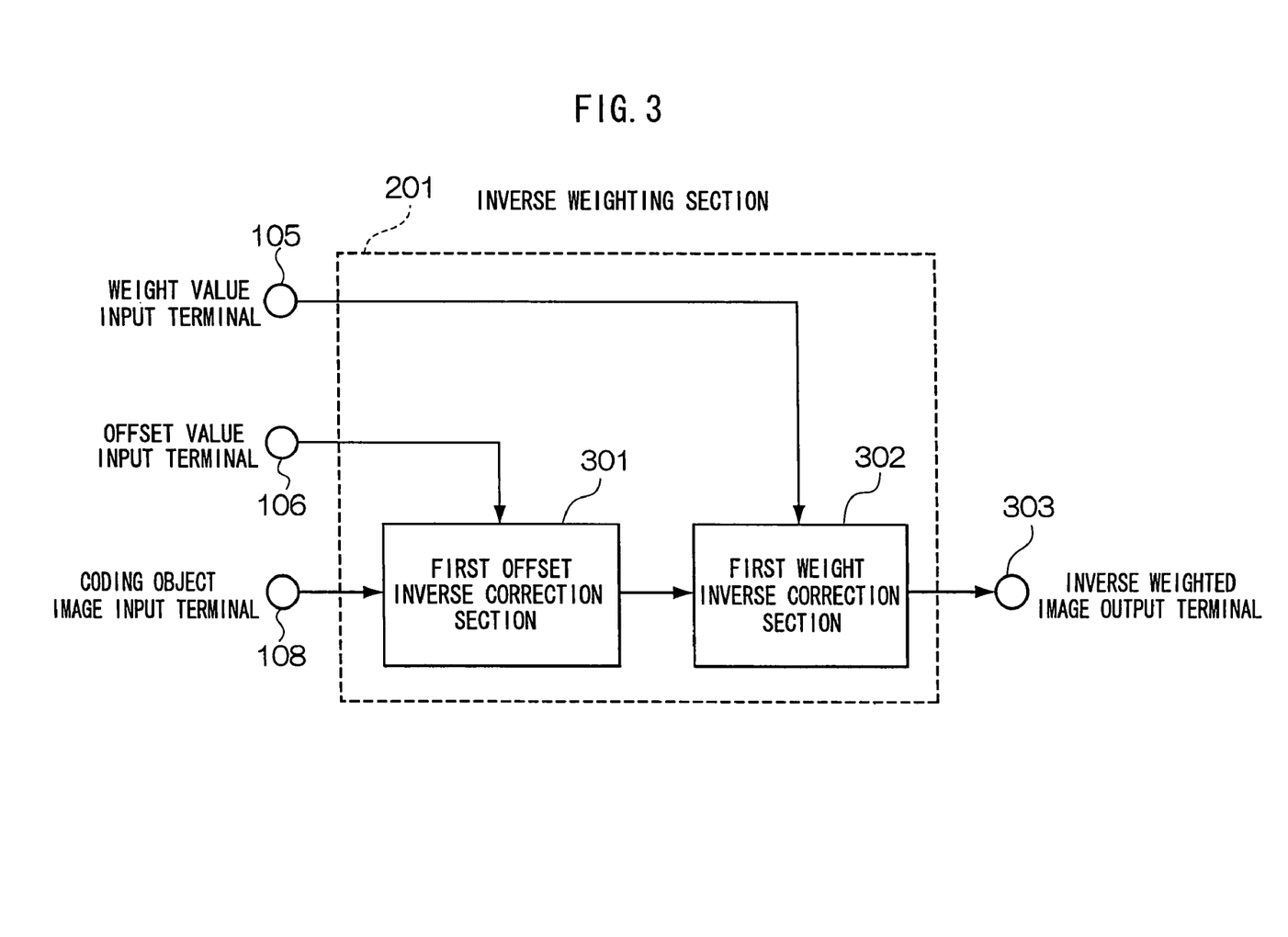
FIG. 3 is a block diagram showing a detailed configuration of an inverse weighting section of the first embodiment.

The inverse weighting section 201 has a configuration as shown in FIG. 3 which is described later in detail. The inverse weighting section 201 implements the inverse weighting by applying the weight value and offset value inputted through the weight value input terminal 105 and the offset value input terminal 106 to the coding object image data inputted through the coding object image input terminal 108 and supplies inverse weighted coding object image data to the image comparing section 202.

The image comparing section 202 compares the inverse weighted coding object image data with the reference image data inputted through the reference image input terminal 107, and supplies the comparison value indicating whether or not they coincide to the determination section 103 through the comparison value output terminal 205.

FIG. 3 is a block diagram showing a detailed configuration of the inverse weighting section 201. As shown in FIG. 3, the inverse weight processing section 201 includes a first offset inverse correction section 301 and a first weight inverse correction section 302. Output data from the first weight inverse correction section 302 is supplied to the image comparing section 202 (see FIG. 2) through an inverse weighted image output terminal 303.

The first offset inverse correction section 301 implements an inverse offset process to the coding object image data inputted through the coding object image input terminal 108, using the offset value inputted through the offset value input terminal 106, and supplies the resultant data to the first weight inverse correction section 302.

The first weight inverse correction section 302 implements an inverse weighting process to the coding object image data to which the inverse offset process has been implemented, using the weight value inputted through the weight value input terminal 105, and supplies the resultant data of the inverse weighted coding object image to the image comparing section 202.

(A-2) Operation of the First Embodiment

Figure 4:
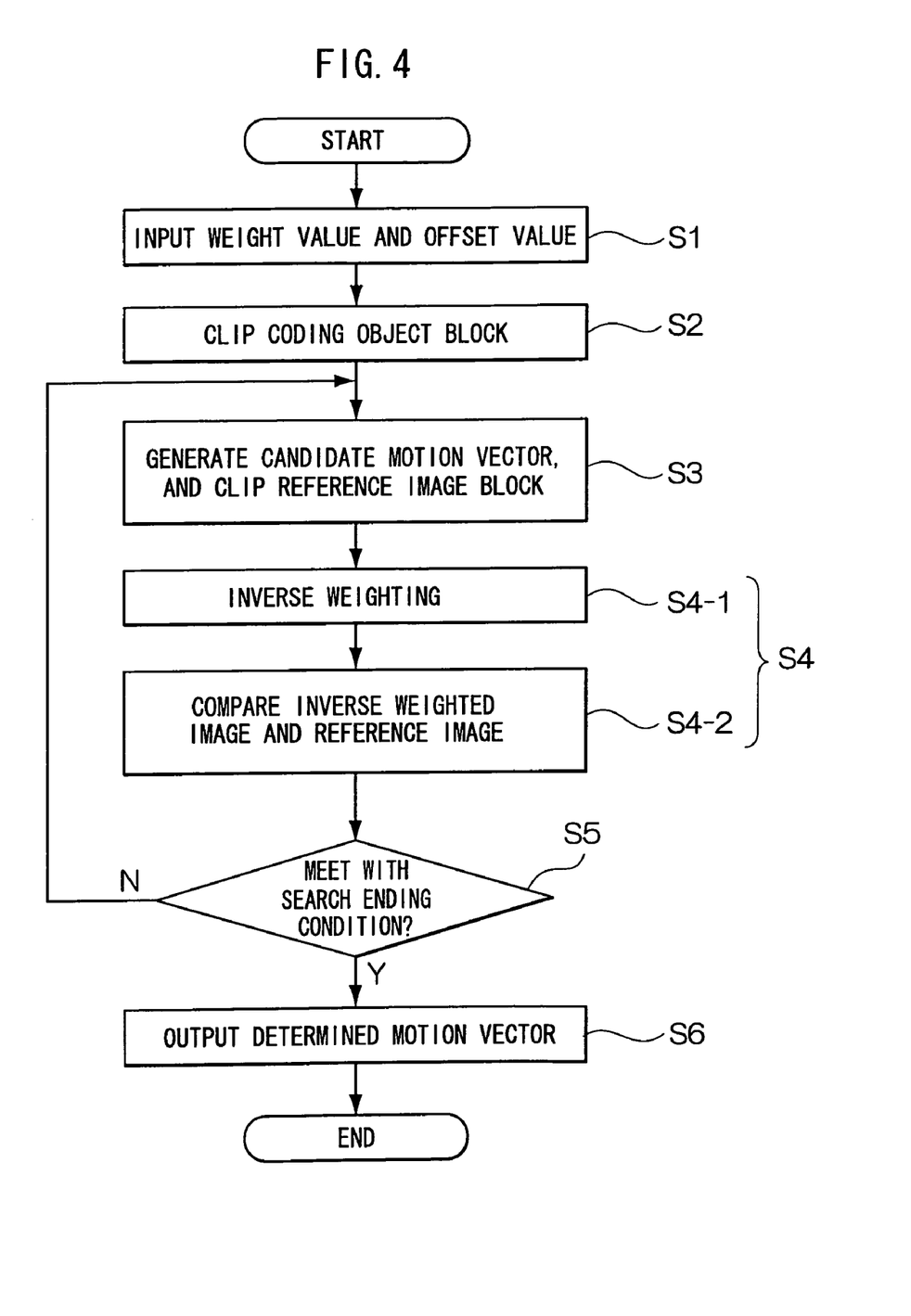
FIG. 4 is a flowchart showing operations of the motion vector searching apparatus of the first embodiment.

Next, operations of the inverse weighting motion vector searching apparatus 101 of the first embodiment (motion vector searching method of the first embodiment) will be explained with reference to a flowchart in FIG. 4. A case where the weight value and the offset value are the same throughout a coding object frame (image) will be explained below. However, a processing area of the coding object image may be, for example, a unit of a slice or an area formed by combining any blocks, and the weight and offset values may differ per each processing area.

(Step S1)

The weight value is inputted to the weight value input terminal 105 and the offset value is inputted to the offset value input terminal 106. Here, for method to finding the weight and offset values, for example, a method described in National Publication No. 2006-509467 may be applied.

(Step S2)

A coding object block is read out (referred) from the coding object image buffer 111 and is inputted from the coding object image input terminal 108. The coding object block may have any size such as 8×8 pixels or 16×16 pixels for example.

(Step S3)

Then the motion vector specifying device 112 generates a motion vector as a candidate motion vector for the read out coding object block. The generated motion vector is inputted to the coding object image buffer 111 and the motion vector input terminal 109.

A reference image block located at position determined from a block position of the coding object block and the motion vector is read out (referred) from the reference image buffer 110 and is inputted to the reference image input terminal 107.

(Step S4)

The inverse weighted image comparing section 102 compares the coding object block with the reference image block (comparison of the inverse weighted image). This inverse weighted image comparison step includes an inverse weighting process (see Step S4-1 which is described later) and an image comparing process (see Step S4-2 which is described later). That is, the inverse weighting process is implemented on the coding object block using the offset value and the weight value at first. After implementing the inverse weighting, the coding object block is compared with the reference image block.

The technology described in National Publication No. 2006-509467 implements a weighting process using an offset value and a weight value on a reference image block and compares a coding object block with the weighted reference image block.

In contrast, the first embodiment implements the inverse weighting process using the offset value and the weight value on the coding object block and compares the reference image block with the inverse weighted coding object block.
(Step S4-1)

In the inverse weighting process, the first offset inverse correction section 301 implements a correction on the coding object block using the offset value at first. Specifically, the first offset inverse correction section 301 carries out an arithmetic operation shown by the following expression (3) on the all pixels Org[x, y] within the coding object block to generate a corrected coding object block DOrg[x, y]:

$$DOrg[x, y]=Org[x, y]-D \qquad (3)$$

where D is the offset value and DOrg[x, y] is the corrected coding object block.

Next, the first weight inverse correction section 302 implements a correction on the coding object block DOrg[x, y], which is corrected using the offset value D, by using the weight value. The first weight inverse correction section 302 carries out an arithmetic operation shown by the following expression (4) on the coding object block DOrg[x, y] corrected using the offset value D to generate a corrected coding object block WDOrg[x, y], where W is the weight value and WDOrg[x, y] is the corrected coding object block. This correction result WDOrg[x, y] is outputted from the inverse weighted image output terminal 303.

$$WDOrg[x, y]=DOrg[x, y]/W \qquad (4)$$

Although the division by the weight value W is carried out in the equation (4), it is also possible to obtain the corrected result WDOrg[x, y] by determining an inverse value of the weight value W (Z=1/W) and multiplying the inverse value Z with DOrg[x, y] as shown in the following expression (5). This is effective for enhancing a computing speed when calculation resources in which processing speed of multiplication is faster than that of division are used.

$$WDOrg[x, y]=DOrg[x, y]*Z \qquad (5)$$

It is also possible to determine the inverse value Z at the outside of the inverse weighted motion vector searching apparatus 101 and to input the inverse value Z to the weight value input terminal so that the first weight inverse correction section 302 implements the arithmetic operation of the expression (5) to obtain the correction result WDOrg[x, y].

Hereinafter, the coding object block on which the inverse weighting process has been carried out will be referred to as an inverse weighted coding object block.
(Step S4-2)

The image comparing section 202 (see FIG. 2) compares the inverse weighted coding object block with the reference image block and outputs a comparison value from the comparison value output terminal 205.

Here, the comparison value may be any kind of value which indicates a degree of approximation of the two images. As the comparison value, a value (SAD: Sum of Absolute Difference) obtained by summing, for all the pixels within the block, an absolute differential value of pixel values of the both images at the same pixel position, or a value (SSD: Sum of Squared Intensity Difference) obtained by summing, for all the pixels within the block, a square of a difference of the pixel values of the both images at the same pixel position and the like is applicable. A case where the SAD is applied as the comparison value will be explained below.
(Step S5)

The process from Steps S3 to S4 are repeated until when the motion vector specifying device 112 (see FIG. 1) sequentially generates motion vectors within the motion vector searching range and ends up to generate all motion vectors or until when the determination section 103 determines that a motion vector to be outputted is found, i.e., until when a search ending condition for one coding object block is satisfied.
(Step S6)

The determination section 103 outputs, as a determination result, the motion vector specified by the motion vector specifying device 112 when a comparison value indicating that the degree of approximation is highest among the comparison values (evaluation values) for the same coding object block is inputted. Alternately, the determination section 103 may output as the determination result the motion vector specified by the motion vector specifying device 112 when a comparison value (evaluation value) better than a threshold value is inputted at the first time.

Because the SAD is used as an index of the degree of approximation of two images, a smaller evaluation value indicates a higher degree of approximation.

It is also possible to create a new evaluation value (e.g., a linear sum of coding amount and evaluation value) by utilizing both of a coding amount when the inputted motion vector is coded and the evaluation value, and carry out the determination based on the new evaluation value. Here, it should be appreciated that an estimate value of the coding amount when the motion vector is coded may be used as the coding amount.

As another determination method performed at the determination section 103, a method used in an existing motion vector searching method may be used.

(A-3) Effect of First Embodiment

According to the first embodiment, it becomes possible to find a motion vector that enhances the coding efficiency as compared to the motion vector search which does not take a weighting into account.

Because the first embodiment implements the inverse weighting to the original image (the coding object image), it is unnecessary to carry out an enormous amount of calculation for implementing a weighting on the reference image, and thereby realizes high-speed processing. Still more, because the weighted reference image is not need to be stored, a large memory capacity is not required. As a result, the first embodiment may be easily carried out even in a built-in apparatus.

That is, an interpolation of pixels is not performed to the original image (the coding object image) which a corresponding image is to be searched, unlike the reference image in which a corresponding image is searched. Therefore, even if the inverse weighting is carried out to the original image, the computation amount may be reduced as compared to the case of carrying out the weighting on the reference image, and thereby, a high-speed processing may be realized. Still more, because the computing amount is suppressed, even when the computed result is stored for utilize in later, the stored amount may be considerably reduced as compared to the case of carrying out the weighting on the reference image.

(B) Second Embodiment

A second embodiment of the motion vector searching apparatus, motion vector searching method and motion vector searching program of the present invention will be explained in detail with reference to the drawings.

Figure 5:
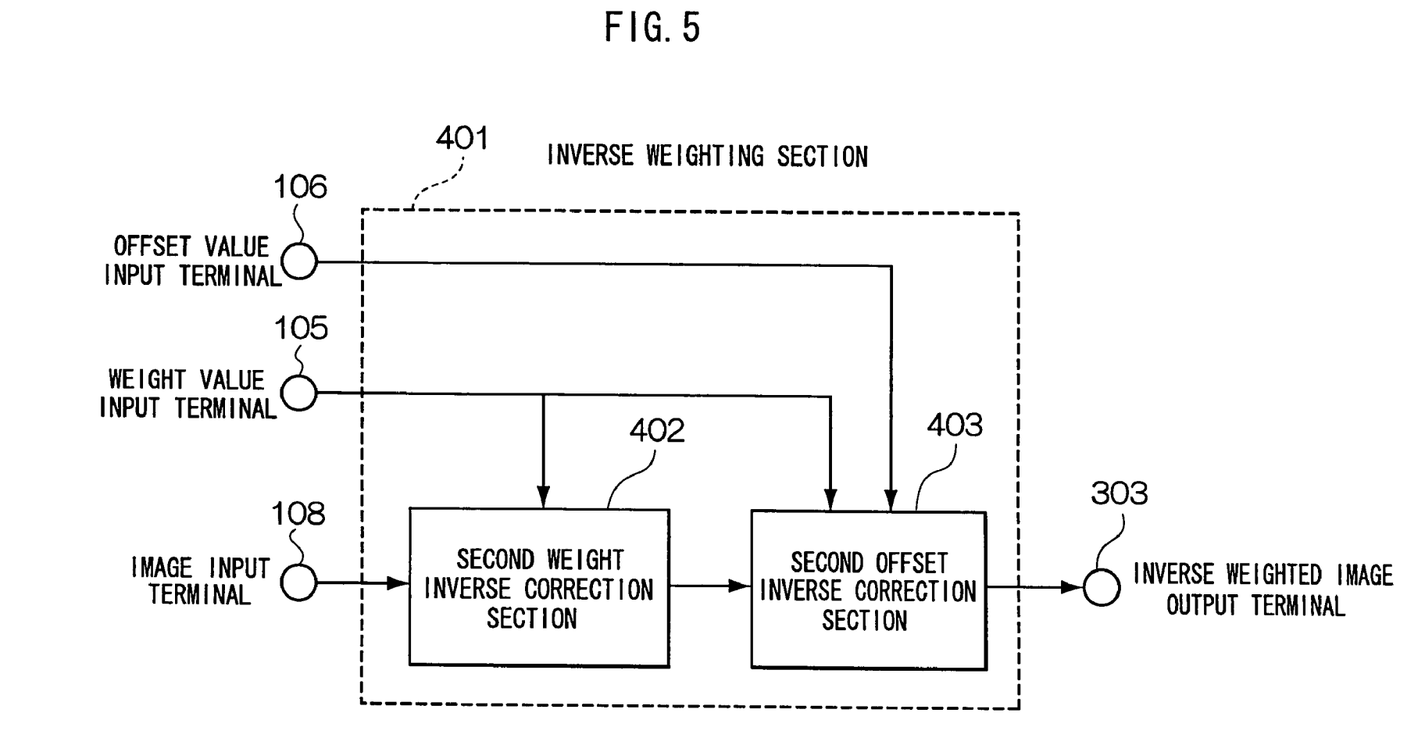
FIG. 5 is a block diagram showing a detailed configuration of the inverse weighting section of a second embodiment.

In the first embodiment described above, the inverse weight processing section 201 having the detailed configuration as shown in FIG. 3 is employed. However, the second embodiment employs an inverse weight processing section 401 having a detailed configuration as shown in FIG. 5. The other configuration of the second embodiment is the same with the first embodiment. Note that the inverse weight processing section 401 of the second embodiment is provided at the position where the inverse weight processing section 201 in the inverse weighted image comparing section 102 of the first embodiment as shown in FIG. 2 is provided.

As shown in FIG. 5, the inverse weight processing section 401 of the second embodiment includes a second weight inverse correction section 402 and a second offset inverse correction section 403. The weight value from the weight value input terminal 105 is inputted not only to the second weight inverse correction section 402 but also to the second offset inverse correction section 403.

Next, operations of the second weight inverse correction section 402 and the second offset inverse correction section 403 will be explained below.

The second weight inverse correction section 402 receives the coding object block Org[x, y] through the input terminal 108 and the weight value W through the weight value input terminal 105. The second weight inverse correction section 402 generates a weight corrected image WOrg[x, y] in accordance to the following expression (6) and outputs it to the second offset inverse correction section 403.

$$WOrg[x, y] = Org[x, y]/W \tag{6}$$

The second offset inverse correction section 403 receives the weight value W through the weight value input terminal 105 and the offset value D through the offset value input terminal 106. The second offset inverse correction section 403 generates an inverse weighted coding object block DWOrg[x, y] in accordance to the following expression (7) and outputs it to the image comparing section 202 (see FIG. 2) via the inverse weighted image output terminal 303.

$$DWOrg[x, y] = WOrg[x, y] - D/W \tag{7}$$

Note that inverse weighted coding object block DWOrg[x, y] of the second embodiment is the same as the inverse weighted coding object block WDOrg[x, y] of the first embodiment when the input to the inverse weight processing section 401 is the same as the input to the inverse weight processing section 201 of the first embodiment.

It is also possible to determine the inverse value Z of the weight value W by Z=1/W in advance, and input it to the weight value input terminal 105 so that the second weight inverse correction section 402 computes the following expression (8) that is equivalent to the expression (6), and the second offset inverse correction section 403 computes the following expression (9) that is equivalent to the expression (7):

$$WOrg[x, y] = Org[x, y]*Z \tag{8}$$

$$DWOrg[x, y] = WOrg[x, y] - D*Z \tag{9}$$

Furthermore, it is possible to calculate E=D/W in advance in addition to the inverse value Z (an input terminal thereof is not shown), and execute computation of the expressions (8) and (10) in the inverse weighting process.

$$DWOrg[x, y] = WOrg[x, y] - E \tag{10}$$

It is possible to reduce divisions in expressions by using the expressions (8) through (10), and thereby a processing time in calculations using general calculation resources, in which more calculation time is required in a division processing than a multiplication process, can be reduced.

Thus, the same effect with the first embodiment described above can be also achieved by the second embodiment.

(C) Other Exemplary Embodiments

While various modifications have been described in the above explanation of the respective embodiments, the following exemplary modifications may be further contemplated.

For instance, when the weight value is determined to be 1 in advance, it is unnecessary to provide the first weight inverse correction section 302 and the second weight inverse correction section 402. In this case, only the inverse correction using the offset value may be carried out by the first offset inverse correction section 301 and the second offset inverse correction section 403, and the corrected value may be outputted to the inverse weighted image output terminal 303.

Furthermore, when the offset value is determined to be 0 in advance, it is unnecessary to provide the first offset inverse correction section 301 and the second offset inverse correction section 403. In this case, only the inverse correction using the weight value may be carried out by the first weight inverse correction section 302 and the second weight inverse correction section 402, and the corrected value may be outputted to the inverse weighted image output terminal 303.

Although a time difference between the coding object image and the reference image has not been mentioned in the embodiments described above, any time difference may be exist as long as the time difference can be used in the search of a motion vector. That is, the time difference is not limited to be a difference of 1 frame and either the coding object image or the reference image may be a past image.

The applications of the motion vector searching apparatus, the motion vector searching method and the motion vector searching program of the invention are not limited to the moving image coding apparatus, the moving image coding method and the moving image coding program but are applicable to various apparatuses which requires to a search motion vector.

According to the present invention, the inverse weighting is carried out on the processing object image and the search of a motion vector is carried out using the inverse weighted processing object image and the reference image. Therefore, it becomes possible to carry out the motion vector search in a short time without requiring a large memory capacity.

What is claimed is:

1. A motion vector searching apparatus to which a reference image, an object image and a weight parameter for the reference image are inputted, for searching a motion vector based thereon, the apparatus comprising:
   an inverse weighting section for generating an inverse weighted object image by performing, on the object image using the weight parameter, a weighting inverse from a weighting performed on the reference image using the weight parameter;
   an image comparing section that compares the generated inverse weighted object image with the reference image to obtain a comparison value indicating a degree of approximation between the two images; and
   a determination section that determines an optimum motion vector by utilizing the comparison value,
   wherein the comparison value obtained by the image comparing section is either one of:
   (a) a value obtained by summing, for all of the pixels of the inverse weighted object image, an absolute value of a difference of pixel values at the same pixel position in the inverse weighted object image and the reference image, and
   (b) a value obtained by summing, for all of the pixels of the inverse weighted object image, a square of the difference of pixel values at the same pixel position in the inverse weighted object image and the reference image.

2. The motion vector searching apparatus according to claim 1, wherein the inverse weighting performed by the inverse weighting section comprises at least one of: an inverse offset process using an offset value given as the weight parameter, and an inverse weighting process using a weight value or an inverse value of the weight value given as the weight parameter.

3. The motion vector searching apparatus according to claim 2, wherein the inverse weighting section generates the inverse weighted object image by subtracting the offset value from a pixel value of the object image, and then dividing the resultant value by the weight value or multiplying the resultant value by the inverse value of the weight value.

4. The motion vector searching apparatus according to claim 2, wherein the inverse weighting section generates the inverse weighted object image by dividing the pixel value of the object image by the weight value or by multiplying the pixel value of the object image by the inverse value of the weight value, and then subtracting, from the resultant value, a value obtained by dividing the offset value by the weight value.

5. The motion vector searching apparatus according to claim 1, further comprising a motion vector specifying section that generates a candidate motion vector for the object image,
wherein the determination section determines the candidate motion vector, which is generated when a comparison value indicating the highest degree of approximation or a comparison value better than a predetermined threshold value is obtained, to be the optimum motion vector.

6. A motion vector searching method in which a reference image, an object image and weight parameters for the reference image are input, and a motion vector is searched based thereon, the method comprising:
generating an inverse weighted object image by performing on the object image using the weight parameter, a weighting inverse from a weighting performed on the reference image using the weight parameter;
comparing the generated inverse weighted object image with the reference image to obtain a comparison value indicating a degree of approximation between the two images; and
determining an optimum motion vector by utilizing the comparison value,
wherein the comparison value is either one of:
(a) a value obtained by summing, for all of the pixels of the inverse weighted object image, an absolute value of a difference of pixel values at the same pixel position in the inverse weighted object image and the reference image, and
(b) a value obtained by summing, for all of the pixels of the inverse weighted object image, a square of the difference of pixel values at the same pixel position in the inverse weighted object image and the reference image.

7. The motion vector searching method according to claim 6, wherein the inverse weighting comprises at least one of: an inverse offset process using an offset value given as the weight parameter, and an inverse weighting process using a weight value or an inverse value of the weight value given as the weight parameter.

8. The motion vector searching method according to claim 7, wherein the inverse weighting comprises generating the inverse weighted object image by subtracting the offset value from a pixel value of the object image, and then dividing the resultant value by the weight value or multiplying the resultant value by the inverse value of the weight value.

9. The motion vector searching method according to claim 7, wherein the inverse weighting comprises generating the inverse weighted object image by dividing the pixel value of the object image by the weight value or by multiplying the pixel value of the object image by the inverse value of the weight value, and then subtracting, from the resultant value, a value obtained by dividing the offset value by the weight value.

10. The motion vector searching method according to claim 6, further comprising generating a candidate motion vector for the object image,
wherein the candidate motion vector which is generated when a comparison value indicating the highest degree of approximation or a comparison value better than a predetermined threshold value is obtained, is determined to be the optimum motion vector.

11. A non-transitory computer-readable storage medium storing a motion vector searching program for searching a motion vector on the basis of a reference image, an object image and a weight parameter for the reference image which are inputted, the program causing a computer to execute a process comprising:
generating an inverse weighted object image by performing, on the object image by using the weight parameter, a weighting inverse from a weighting performed on the reference image by using the weight parameter;
comparing the generated inverse weighted object image with the reference image to obtain a comparison value indicating a degree of approximation between the two images; and
determining an optimum motion vector by utilizing the comparison value,
wherein the comparison value obtained by the image comparing section is either one of:
(a) a value obtained by summing, for all of the pixels of the inverse weighted object image, an absolute value of a difference of pixel values at the same pixel position in the inverse weighted object image and the reference image, and
(b) a value obtained by summing, for all of the pixels of the inverse weighted object image, a square of the difference of pixel values at the same pixel position in the inverse weighted object image and the reference image.

* * * * *